Patented Mar. 13, 1934

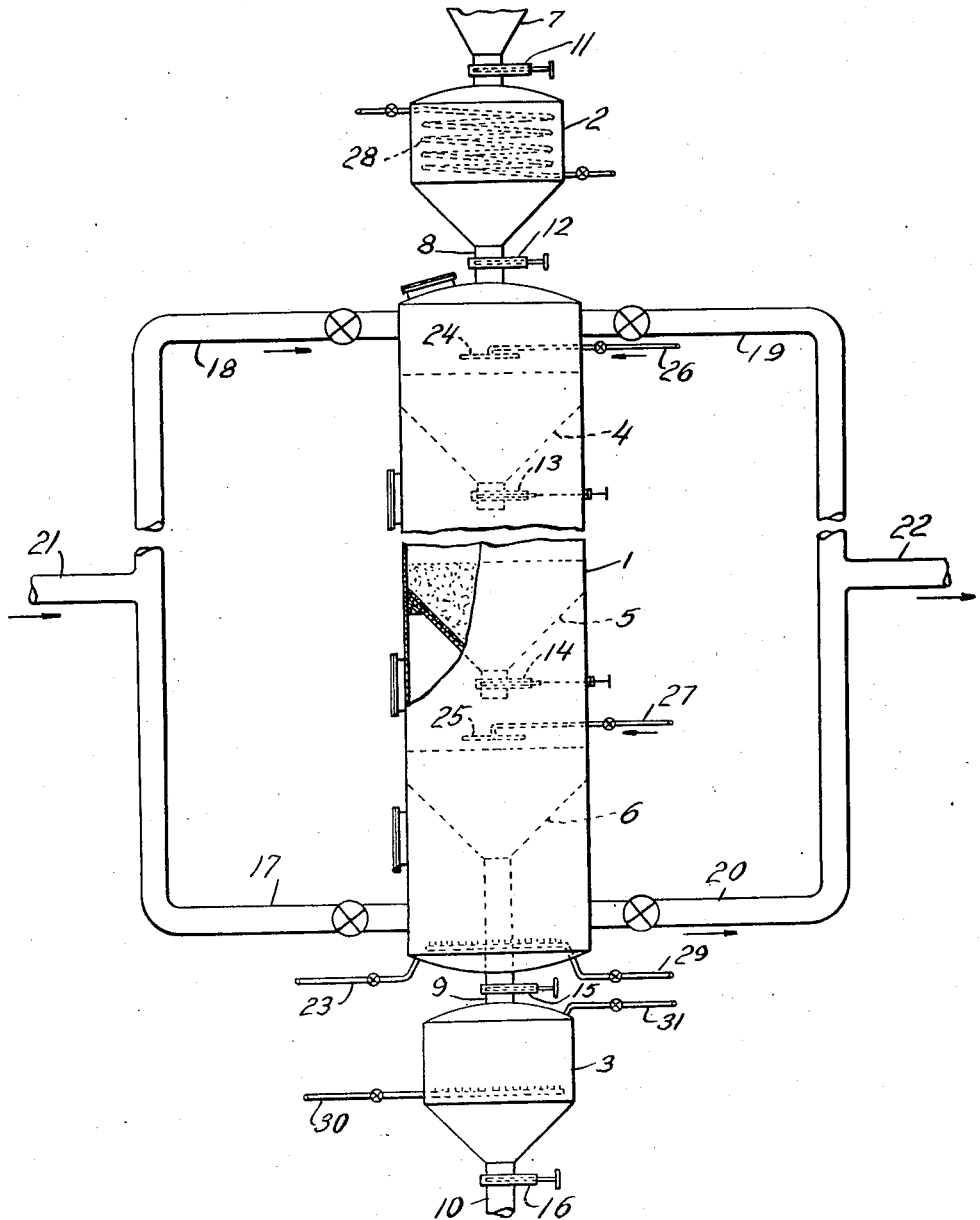

1,951,120

UNITED STATES PATENT OFFICE 1,951,120

ART OF REFINING HYDROCARBONS

Frank A. Apgar, East Chicago, and Kenneth A. Beach, Whiting, Ind., assignors to Sinclair Refining Company, New York, N. Y., a corporation of Maine Application February 25, 1928, Serial No. 256,979

5 Claims. (Cl. 196—96)

This invention relates to improvements in the refining, in the vapor phase, of hydrocarbons and hydrocarbon mixtures. The invention is useful, for example, in the vapor phase refining of gasoline and kerosenes and other hydrocarbon oils.

The invention relates particularly to improvements in vapor phase refining operations in which the hydrocarbon vapors are passed in contact with an adsorptive catalyst such as fuller's earth to separate, by adsorption or polymerization or otherwise, components of the hydrocarbon vapors not suitable as constituents of the desired product. As this type of operation is commonly carried out, the hydrocarbon vapors are passed in contact with a batch of the adsorptive catalyst which is initially fresh and highly active and which is replaced by a fresh batch by the time it is substantially spent and almost inactive. As a consequence, the refining treatment to which the hydrocarbon vapors are subjected as the operation proceeds is not uniform, and this non-uniformity entails several disadvantages. One of the resulting disadvantages is a tendency toward non-uniformity of the product. Again, for practical purposes, the expense of replacing or renewing the adsorptive catalyst cannot be disregarded and it is, therefore, important to make full use of the adsorptive catalyst, and the expense of apparatus and of operation also must be kept within reasonable limits with respect to capacity. This invention provides an improved method which, while making full use of the adsorptive catalyst and not involving expensive apparatus or operation, makes possible an important improvement in the uniformity of the refining operation and at the same time has several further important advantages. The improved method of the invention, for example, is particularly adapted to continuous operation, this in turn making possible further improvement in the refining operation itself.

According to the present invention, the hydrocarbon vapors to be subjected to the refining treatment are passed successively through a series of bodies of the adsorptive catalyst and the material in these several bodies of the adsorptive catalyst is progressively advanced, spent material being discharged from the last body in the series and fresh material being supplied to the first body in the series, to maintain more nearly uniform the average activity of the entire mass of the adsorptive catalyst in contact with which the hydrocarbon vapors are passed. At the same time, this makes it possible to carry on the operation in a continuous manner without requiring alternative apparatus to be used in the operation while the adsorptive catalyst in other apparatus is being replaced. The improved uniformity of this operation makes possible several improvements with respect to the refined product; a higher yield of the refined product may be obtained, a higher yield of the refined product per unit of the adsorptive catalyst used may be obtained, the character of the refined product for example as to color may be more closely limited or controlled during the operation, and the extent to which polymerization proceeds may similarly be more closely limited or controlled during the operation. The invention also includes several special features of control which will be described. The improved uniformity of the operation and the close control afforded also makes it possible to avoid overtreatment of any part of the hydrocarbon vapors subjected to the refining operation, as frequently occurs during the initial period of operation while the adsorptive catalyst is highly active in operations of the ordinary type. Losses entailed in overtreatment are thus avoided. In many cases an improved economy with respect to consumption of the adsorptive catalyst may be effected. The improved operation of the invention makes it possible more completely to exhaust the adsorptive catalyst than is usually possible in ordinary operations, since the refining operation cannot economically be carried out on a single batch of adsorptive catalyst for any period longer than that within which the refining operation is completed at a reasonable rate. The invention further provides for progressive separation of polymers as formed thus, in another respect, operating to prolong the life of the adsorptive catalyst.

The operation of the invention, being continuous, also may usually be carried out with less expense than operations in which single batches of the adsorptive catalyst are used in succession. Continuous operation further affords peculiar advantages in vapor phase refining operations of the type to which this invention particularly relates. For best results it is usually desirable to bring the adsorptive catalyst approximately to the operating temperature before the hydrocarbon vapors are passed in contact therewith. When discharged from the refining operation, it is usually necessary to strip the adsorptive catalyst of contained vaporizable hydrocarbons or cool it approximately to atmospheric temperature before exposing it to the atmosphere. Such operations as commonly carried out materially reduce the proportion of time during which individual units of the refining apparatus are usefully employed for carrying out the refining operation proper. Such loss of useful operating time is avoided by this invention.

The invention will be further described in connection with the accompanying drawing which illustrates, diagrammatically and conventionally, in elevation and partly in section and with parts broken away, apparatus adapted for carrying out the invention, but it is intended and will be understood that this more detailed description and illustration of the invention are by way of exemplification.

The apparatus illustrated comprises a tower 1, in which the vapor phase refining operation proper is carried out, a chamber 2 for preheating the adsorptive catalyst supplied to the operation, and a chamber 3 for stripping the adsorptive catalyst discharged from the operation of vaporizable hydrocarbons. The tower 1 is divided into a series of compartments separated by foraminous partitions 4, 5 and 6 adapted to retain charges of the adsorptive catalyst but to permit free passage of hydrocarbon vapors. A hopper 7 is provided for charging chamber 2 and a connection 8 is provided for supplying the preheated adsorptive catalyst from chamber 2 to the uppermost compartment in tower 1. A connection 9 is provided for discharging spent material from the lowermost compartment in tower 1 into chamber 3 and a connection 10 is provided for discharging stripped spent material from chamber 3. The bottoms of the chambers 2 and 3 and the partitions separating the compartments in the tower 1 are sloped toward the discharge point to facilitate progress of the adsorptive catalyst through the apparatus. Valves 11, 12, 13, 14, 15 and 16 are provided for controlling the supply of the adsorptive catalyst to the apparatus, the passage of the adsorptive catalyst through the apparatus and the discharge of the adsorptive catalyst from the apparatus. The hydrocarbon vapors to be refined may be passed upwardly or downwardly through the tower 1, the apparatus illustrated including branch connections, 17 and 18 and 19 and 20, between connection 21 through which the hydrocarbon vapors are supplied to the apparatus and connection 22 through which the hydrocarbon vapors are discharged from the apparatus to permit operation in either manner. Connection 23 is provided for discharging from the lower end of the tower 1 liquefied hydrocarbons including polymers produced in the refining operation. Spray heads 24 and 25 communicating with valved supply connections 26 and 27, respectively, are provided for the introduction of temperature controlling media. The supply chamber 2 is provided with suitable heating means such as the steam coil 28 illustrated. Connection 29 communicating with a perforated discharge pipe in the interior of the tower 1 is provided for the introduction of steam or other suitable heating medium into the lower end of the tower. Connection 30 communicating with a perforated discharge pipe in the interior of the discharge chamber 3 is similarly provided for the introduction of steam or other suitable stripping medium into this chamber. Connection 31 communicates with a condenser and receiver for the recovery of condensable hydrocarbons vaporized from the discharged adsorptive catalyst. The several connections illustrated are provided with valves, as shown, to afford appropriate control. It will be understood that the number of compartments in the tower 1 may be varied to suit the requirements of a particular case.

The operation of the apparatus illustrated, with upflow of the hydrocarbon vapors to be refined therethrough is usually to be preferred because several special advantages are thus secured, as will appear.

In carrying out the invention in the apparatus illustrated, the hydrocarbon vapors to be refined are supplied through connection 21 and passed through the tower 1 and the charges of the adsorptive catalyst therein, and the refined vapors are discharged through connection 22. As the hydrocarbon vapors contact with the adsorptive catalyst, for example, fuller's earth of 40–60 or 60–80 mesh, certain types of unsaturated constituents, such as di-olefines, to the extent that they are present are polymerized, forming polymers of boiling point higher than that of these constituents as originally present. This reaction, under appropriately regulated conditions, makes possible the separation of such constituents as a condensate liquefied from the vapors. In refining gasoline, for example, this operation makes possible the removal of such constituents which are objectionable as components of gasoline intended for use as motor fuel without the removal of other unsaturated constituents which are desirable components of motor fuel products. Since the polymerization reaction is exothermic it will be apparent that, if such polymers are to be separated in the same operation in which they are produced, control of the temperature at which the vapors escape from the refining operation is necessary to prevent such polymers being carried along with the otherwise refined product. Excessive temperatures also tend toward overtreatment and loss due to polymerization of constituents suitable as components of the refined product. At the same time it is desirable to maintain the temperature conditions within the operation such that but a minimum of constituents suitable as components of the refined products are condensed with the polymers separated in the operation. This requisite control is complicated by the fact that the adsorptive catalysts used are much more active as initially supplied to the operation than as discharged therefrom. In addition to constituents polymerized by the action of the adsorptive catalyst, other undesirable constituents may be removed from the hydrocarbon vapors at the same time by this action.

When the apparatus illustrated is initially charged with the adsorptive catalyst, if normal operating charges are supplied to each of the several compartments, the polymerization reaction proceeds very vigorously for some time. This result may be counteracted with particular advantage by initially charging only the uppermost compartment, then discharging the adsorptive catalyst from this compartment to the next lower compartment and supplying additional fresh material to the uppermost compartment before a point is reached at which the vapors escaping from the tower are not satisfactorily refined and so on until there is a normal operating charge of the adsorptive catalyst in each of the compartments of the tower. Prior to the first introduction of hydrocarbon vapors the tower and the initial charge or charges of the adsorptive catalyst may be brought approximately to the operating temperature by the passage therethrough of hot dry steam or other suitable heating medium. During initial operation, the refining operation may be further controlled by the introduction of a refluxing medium through one or the other of the spray heads 24 and 25. An oil fraction corresponding in boiling range to the condensate from the refined hydrocarbon vapors and suitable to be admixed therewith is advantageously employed as such refluxing medium. In refining gasoline, for example, a condensed gasoline fraction may be so used. Or the introduction of such a refluxing medium may be used where normal charges of the adsorptive catalyst are supplied to each of the compartments initially to control the operation and to avoid overtreatment of the hydrocarbon vapors. When the hydrocarbon vapors to be refined are passed upwardly through the tower 1 such refluxing media are introduced through spray head 24, when passed downwardly through spray head 25.

When the normal operating balance is reached, each of the compartments in tower 1 contains a charge of the adsorptive catalyst, the temperature of the escaping vapors is maintained such that the constituents of a boiling point higher than suitable as components of the refined product including polymers produced in the refining operation are liquefied and thus separated in the tower and the temperature of the condensate liquefied within the tower is maintained such that but a minimum of constituents suitable as components of the desired product are condensed therein, the rate of passage of the hydrocarbon vapor through the several charges of adsorptive catalyst being maintained with respect to the average activity of the total mass of the adsorptive catalyst such that the escaping hydrocarbon vapors are refined to the extent desired. The temperature of the escaping vapors may be controlled by the introduction of a refluxing medium through spray head 24 or spray head 25, and the temperature of the condensate liquefied within the tower may be controlled, if necessary, by the introduction of a suitable heating medium through connection 29. To maintain uniform, or nearly uniform, this operating balance, in carrying out the present invention, the several charges of the adsorptive caltalyst within the tower 1 are at regular intervals progressively advanced through the tower, a fresh charge of the adsorptive catalyst is supplied to the uppermost compartment and the spent charge of adsorptive catalyst in the lowermost compartment is discharged. In this manner, the amount of the spent adsorptive catalyst discharged and the amount of fresh adsorptive catalyst supplied in each step as the operation proceeds being only a part of the total mass of the adsorptive catalyst through which the hydrocarbon vapors are passed, advantageously only a relatively small part thereof, the average activity of the total mass of the adsorptive catalyst in contact with which the hydrocarbon vapors are passed is made more nearly uniform and as a consequence the refining action and the operation are made more nearly uniform with the several advantages which have been mentioned. Variations from the mean activity of the total mass of the adsorptive catalyst within the tower in the intervals between replacements of part of the adsorptive catalyst are accommodated, for example, by control of the rate at which the refluxing medium is supplied to the operation. Usually, however, such variations, particularly if the successive replacements of the adsorptive catalyst represents but a small part of the total mass, are of minor importance. Each charge of fresh adsorptive catalyst before introduction into the uppermost compartment in the tower 1 is preheated in chamber 2 approximately to the operating temperature. Variations in the mean activity of the total mass of the adsorptive catalyst in the tower 1 may also be accommodated, within limits, by introducing each fresh charge of adsorptive catalyst at a temperature somewhat below the normal operating temperature thus counteracting the initial activity of each successive charge. The condensate liquefied within the tower 1 seeps downwardly through the several charges of the adsorptive catalyst to the lower end of the tower from which it is discharged through connection 23. As successive charges of the spent adsorptive catalyst are discharged into chamber 3 they are stripped of vaporizable hydrocarbons by the introduction of steam or other suitable stripping medium through connection 30, the vaporized hydrocarbons being taken off through connection 31. The stripped spent material is then discharged through connection 10.

In the apparatus illustrated, it will be understood that the progressive advance of the several charges of the adsorptive catalyst through the tower 1 is effected by successively opening valve 15 to discharge the material in the lowermost compartment in the discharge chamber 3 and then closing this valve, opening valve 14 to discharge the material in the next compartment above into the lowermost compartment and then closing this valve, and so on until a fresh charge is introduced into the uppermost compartment after valve 13 is closed by opening valve 12 to discharge the contents of the supply chamber 2 into the uppermost compartment and then closing this valve.

It will be noted that, in the apparatus illustrated, a free vapor space, in which the velocity of the hydrocarbon vapors flowing through the tower is reduced, is provided between each of the several charges of the adsorptive catalyst in the several compartments. This arrangement materially assists in prolonging the life of the adsorptive catalyst, apparently because it provides an improved opportunity for progressive separation of higher boiling polymers and the like as they are formed. With upflow of the hydrocarbon vapors through the tower, particularly, the higher boiling polymers and the like separated in the successive vapor spaces between the several charges of the adsorptive catalyst flow downwardly through the tower without coming in contact with following charges of the catalyst so that those charges of the adsorptive catalyst with which the vapors last contact are subjected to but a minimum of contact with such higher boiling polymers and the like. With up-flow of vapors through the tower 1, for example, higher boiling material carried with the vapors through the charge of catalyst on partition 6 separate in the free vapor space below partition 5 without being brought in contact with the charge of catalyst thereon, and so on through the tower, so that the higher boiling polymers and the like formed in the successive charges are not required to pass through charges of the catalyst through which the vapors pass after passing through that charge in which such higher boiling material is formed.

In carrying out this invention, and with the apparatus illustrated, the refining operation proper need not be discontinued as the several charges of the adsorptive catalyst are advanced through the operation or as fresh material is supplied and spent material is discharged. Likewise, cooling or purging and reheating of the apparatus as a part of the operation for replacing spent material is made unnecessary.

The invention is particularly useful in connection with refining operations carried out with fuller's earth, an adsorptive catalyst which has been mentioned particularly. The invention is also useful in connection with refining operations carried out with other adsorptive catalysts such as activated carbon, silica gel, metallic gels and similar agents.

We claim:

1. In vapor phase refining of hydrocarbons with adsorptive catalysts, the improvement which comprises passing the hydrocarbon vapors through a series of bodies of the adsorptive catalyst and, as the operation proceeds, discharging spent material from the body of the adsorptive catalyst nearest exhaustion at one end of the series and supplying fresh material to the body of adsorptive catalyst at the other end of the series while progressively advancing the material in the several bodies of the series from body to body toward the body nearest exhaustion whereby the average activity of the total mass of the adsorptive catalyst in contact with which the vapors are passed is maintained closely uniform.

2. In vapor phase refining of hydrocarbons with adsorptive catalysts, the improvement which comprises passing the hydrocarbon vapors through a series of bodies of the adsorptive catalyst and, as the operation proceeds, discharging spent material from the body of the adsorptive catalyst nearest exhaustion at one end of the series and supplying preheated fresh material to the body of adsorptive catalyst at the other end of the series while progressively advancing the material in the several bodies of the series from body to body toward the body nearest exhaustion whereby the average activity of the total mass of the adsorptive catalyst in contact with which the vapors are passed is maintained closely uniform.

3. In vapor phase refining of hydrocarbons with adsorptive catalysts, an improvement which comprises passing hydrocarbon vapors through a series of bodies of the adsorptive catalyst and, as the operation proceeds discharging spent material from the body of the adsorptive catalyst nearest exhaustion, at one end of the series and supplying fresh material to the body of adsorptive catalyst at the other end of the series while progressively advancing material in the several bodies of the series from body to body toward the body nearest exhaustion, said fresh material supplied to the first body of the series of bodies being supplied thereto at a temperature less than the operating temperature.

4. In vapor phase refining of hydrocarbons with adsorptive catalysts, the improvement which comprises passing the hydrocarbon vapors through a series of bodies of the adsorptive catalyst and, as the operation proceeds, discharging spent material from the body of the adsorptive catalyst nearest exhaustion at one end of the series and supplying fresh material to the body of adsorptive catalyst at the other end of the series while progressively advancing the material in the several bodies of the series from body to body toward the body nearest exhaustion and controlling the temperature at which hydrocarbon vapors leave the operation by regulated introduction of a refluxing medium.

5. In vapor phase refining of hydrocarbons with adsorptive catalysts, the improvement which comprises passing the hydrocarbon vapors through a series of bodies of the adsorptive catalyst and, as the operation proceeds, discharging spent material from the body of the adsorptive catalyst nearest exhaustion at one end of the series and supplying fresh material to the body of adsorptive catalyst at the other end of the series while progressively advancing the material in the several bodies of the series from body to body toward the body nearest exhaustion and separating polymers produced in the operation from the hydrocarbon vapors as they pass between successive bodies of the series.

FRANK A. APGAR.
KENNETH A. BEACH.